(12) United States Patent
O'Rourke et al.

(10) Patent No.: US 6,396,972 B1
(45) Date of Patent: May 28, 2002

(54) THERMALLY ACTUATED OPTICAL ADD/ DROP SWITCH

(75) Inventors: John O'Rourke, Los Altos Hills; David Andersen, Sunnyvale, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/501,351

(22) Filed: Feb. 9, 2000

(51) Int. Cl.[7] .............................. G02B 6/26; G02B 6/42
(52) U.S. Cl. .............................. 385/17; 385/18; 385/19
(58) Field of Search ...................... 385/16–19; 359/124, 359/127, 128

(56) References Cited

U.S. PATENT DOCUMENTS

| | | | |
|---|---|---|---|
| 4,988,157 A | 1/1991 | Jackel et al. | 350/96.13 |
| 5,699,462 A | 12/1997 | Fouquet et al. | 385/18 |
| 5,903,686 A | 5/1999 | MacDonald | 385/16 |
| 5,960,131 A * | 9/1999 | Fouquet et al. | 385/17 |
| 6,055,344 A * | 4/2000 | Fouquet et al. | 385/16 |
| 6,144,781 A * | 11/2000 | Goldstein et al. | 385/18 |
| 6,160,928 A * | 12/2000 | Schroeder | 385/18 |
| 6,195,478 B1 * | 2/2001 | Fouquet | 385/17 |
| 6,198,856 B1 * | 3/2001 | Schroeder et al. | 385/17 |

* cited by examiner

Primary Examiner—Hemang Sanghavi
Assistant Examiner—Scott Knauss

(57) ABSTRACT

An optical switching arrangement, preferably an add/drop switch, provides a high degree of flexibility in manipulating optical signals by utilizing switching units that are mirror images of each other. The switching units are toggled between transmissive states and reflective states by the manipulation of index-matching fluid within trenches. In a first set of switching units, the trenches are offset in one direction relative to crosspoints of waveguides through which optical signals are propagated. In the second set of switching units, the trenches are offset in the opposite direction. As a result, the reflection characteristics of the first set of switching units are the mirror image of the reflection characteristics of the second set of switching units. In the preferred add/drop switching application, any one of a number of input ports can be optically coupled to any one of a number of drop ports and any one of a number of add ports can be optically coupled to any one of a number of output ports. Also in the preferred application, the paths from the input ports to the associated output ports are identical with respect to path lengths and the number of trenches that must be traversed, so that an optical signal will experience the same insertion loss regardless of the particular input-to-output path that it follows.

18 Claims, 4 Drawing Sheets

THERMALLY ACTUATED OPTICAL ADD/DROP SWITCH

TECHNICAL FIELD

The invention relates generally to optical switching arrangements and more particularly to arrangements of thermally actuated switching units for selectively manipulating optical signals from input and add ports to output and drop ports.

BACKGROUND ART

While signals within telecommunications and data communications networks have been traditionally exchanged by transmitting electrical signals via electrically conductive lines, an alternative mode of data exchange is the transmission of optical signals through optical fibers. Information is exchanged in the form of modulations of laser-produced light. The equipment for efficiently generating and transmitting the optical signals has been designed and implemented, but the design of optical switches for use in telecommunications and data communications networks is problematic. As a result, switching requirements within a network that transmits optical signals is sometimes satisfied by converting the optical signals to electrical signals at the inputs of a switching network, and then reconverting the electrical signals to optical signals at the outputs of the switching network.

Recently, reliable optical switching systems have been developed. U.S. Pat. No. 5,699,462 to Fouquet et al., which is assigned to the assignee of the present invention, describes a switching matrix that may be used for routing optical signals from any one of a number of parallel input optical fibers to any one of a number of parallel output optical fibers. An isolated switching unit 10 is shown in FIG. 1. The switching unit includes planar waveguides that are formed by layers on a substrate. The waveguide layers include a lower cladding layer 14, an optical core 16, and an upper cladding layer, not shown. The optical core is primarily silicon dioxide, but with other materials that achieve a desired index of refraction for the core. The cladding layers are formed of a material having a refractive index that is substantially different than the refractive index of the core material, so that optical signals are guided along the core.

The layer of core material 16 is patterned into waveguide segments that define a first input waveguide 20 and a first output waveguide 26 of a first optical path and define a second input waveguide 24 with a second output waveguide 22 of a second optical path. The upper cladding layer is then deposited over the patterned core material. A gap is formed by etching a trench 28 through the core material, the upper cladding layer, and at least a portion of the lower cladding layer 14. The first input waveguide 20 and the second output waveguide 22 intersect a sidewall of the trench 28 at an angle of incidence greater than the critical angle of total internal reflection (TIR) when the crosspoint 30 of the waveguides is filled with a vapor or gas. Thus, TIR diverts light from the input waveguide 20 to the output waveguide 22, unless an index-matching fluid resides within the crosspoint 30 between the aligned input and output waveguides 20 and 26. The trench 28 is positioned with respect to the four waveguides such that one sidewall of the trench passes through or is slightly offset from the intersection of the axes of the waveguides.

The above-identified patent to Fouquet et al. describes a number of alternative approaches to switching the optical switching unit 10 between a transmissive state and a reflective state. One approach is illustrated in FIG. 1. The switching unit 10 includes a microheater 38 that controls formation of a bubble within the fluid-containing trench. While not shown in the embodiment of FIG. 1, the waveguides of a switching matrix are typically formed on a waveguide substrate and the heaters and heater control circuitry are integrated onto a heater substrate that is bonded to the waveguide substrate. The fluid within the trench has a refractive index that is close to the refractive index of the core material 16 of the four waveguides 20–26. Fluid fill-holes 34 and 36 may be used to provide a steady supply of fluid, but this is not critical. In the operation of the switching unit, the heater 38 is brought to a temperature sufficiently high to form a bubble. Once formed, the bubble can be maintained in position by maintaining power to the heater. In FIG. 1, the bubble is positioned at the crosspoint 30 of the four waveguides. Consequently, an input signal along the waveguide 20 will encounter a refractive index mismatch upon reaching the sidewall of the trench 28. This places the switching unit in a reflective state, causing the optical signal along the waveguide 20 to be redirected to the second output waveguide 22. However, even in the reflective state, the second input waveguide 24 is not in communication with the first output waveguide 26.

If the heater 38 at crosspoint 30 is deactivated, the bubble will quickly condense and disappear. This allows index-matching fluid to fill the crosspoint 30 of the waveguides 20–26. The switching unit 10 is then in the transmissive state, since input signals will not encounter a significant change in refractive index at the interfaces of the input waveguides 20 and 24 with the trench 28. In the transmissive state, the optical signals along the first input waveguide 20 will propagate through the trench to the first output waveguide 26, while optical signals that are introduced via the second input waveguide 24 will propagate through the trench to the second output waveguide 22.

Matrices of the switching elements 10 may be used to form complex switching arrangements., A switching matrix may have any number of input ports (N) and any number of output ports (M), With each port being connected to an optical fiber. The fluid-controlled switching units allow the arrangement to be a strictly "non-blocking" matrix, since any free input fiber can be optically coupled to any free output fiber without rearrangement of existing connections.

Another type of switching matrix is an add/drop multiplexer that includes add ports and drop ports in addition to the input and output ports. Such multiplexers are utilized in telecommunications applications in which signals are passed through a series of nodes, with each node being able to introduce additional signals and being able to extract those signals that identify that node as a target. For example, each node may be a switching facility of a long distance carrier that supports calls to and from a number of cities. Calls that originate in a city are introduced using add ports within the switching facility of that city. On the other hand, data and voice information for calls directed to a telephone supported by that switching facility are extracted via drop ports. A known switching arrangement 42 that can be used as a rearrangeable add/drop switch is shown in FIG. 2. The arrangement includes a 4×4 matrix of optical switching units for selectively coupling any one of four input ports 44, 46, 48 and 50 to any one of four output ports 52, 54, 56 and 58. In FIG. 2, each of the switching units that is in a reflective state is shown as having a bubble at the area of the intersection of input and output waveguides to that switching unit. Thus, switching units 60, 62, 64 and 66 are in reflective states. The remaining twelve switching units are in the transmissive state, since there are no bubbles present at the intersections of the input and output waveguides to those switching units.

Optical fibers are connected to each of the input ports 44–50 and each of the output ports 52–58. An optical signal that is introduced at the input port 44 will be reflected at the switching unit 62 and will be output via the output port 54. Similarly, an optical signal from the input port 46 will reflect at the switching unit 64 for output at the port 56. An optical signal from input port 48 reflects at the switching unit 66 for output via the port 58. Finally, an optical signal on port 50 is reflected to output port 52 by the switching unit 60. By selectively manipulating the bubbles within the various trenches, any one of the input ports can be connected to any one of the output ports.

The arrangement 42 includes four add ports 68, 70, 72 and 74. Each add port is uniquely associated with one of the output ports 52–58, since an optical signal that is introduced at one of the add ports can be directed only to its aligned output port. Thus, an optical signal on add port 68 can be directed to the output port 52 by changing the switching unit 60 to the transmissive state. This change to the transmissive state places the input port 50 in optical communication with a drop port 76. The drop port 76 is uniquely associated with the input port 50, since the drop port cannot be optically coupled to any other input or add port. Similarly, each one of three other drop ports 78, 80 and 82 is uniquely associated with the input port 44, 46 and 48, respectively, with which the drop port is linearly aligned.

A concern with the optical arrangement 42 of FIG. 2 is that it allows a limited flexibility with regard to introducing and extracting signals. What is needed is an optical switching arrangement that has a high degree of flexibility with respect to channeling optical signals from input ports to drop ports and from add ports to output ports. Another concern with the prior art arrangement is that the differences in the path lengths and the number of switching units that must be traversed to link a particular input port to a particular output port lead to non-uniform signal strength losses. Therefore, what is also needed is an arrangement that promotes uniformity of signal losses.

SUMMARY OF THE INVENTION

Both an increased flexibility in manipulating optical signals within a waveguide arrangement having thermally actuated switching units and a greater uniformity in the loss characteristics along transmission paths within the arrangement are achieved by forming at least two sets of fluid-containing trenches, with the difference between the sets being the direction of the offset of trenches relative to crosspoints of waveguides. That is, the spatial relationship of first trenches (e.g., left-aligned trenches) relative to waveguide crosspoints with which they are associated is the mirror image of the spatial relationship of second trenches (e.g., right-aligned trenches) to the waveguide crosspoints with which they are associated. As a result, the reflection characteristics of the first trenches are a mirror image of the reflection characteristics of the second trenches.

In the preferred embodiment, the optical arrangement is an add/drop switch having an array of generally parallel first optical paths with input ports at first ends and output ports at opposite ends. Each optical path is formed of generally aligned waveguides that intersect the fluid-containing trenches. The first optical paths are intersected at the first trenches by drop paths. Each drop path has a drop port at one end and is formed of generally aligned waveguides. The first optical paths are intersected at the second trenches by add paths. The add paths are formed by waveguides and include add ports. By manipulating the fluid within the first trenches, any input port can be optically coupled to any of the drop ports. Similarly, by manipulating fluid within the second trenches, any of the add ports can be optically coupled to any of the output ports.

Each trench defines a switching unit that is responsive to the manipulation of index-matching fluid to change between a reflective state and a transmissive state. Typically, the fluid is a liquid having a refractive index that closely matches the refractive index of the optical core material of the waveguides. Consequently, when fluid resides at the interface of a trench with a waveguide, an optical signal propagating through the waveguide will enter the trench and will propagate through the trench to the waveguide that is at the opposite sidewall of the trench. On the other hand, when there is an absence of liquid at the waveguide-to-trench interface, the trench is in a reflective state and any optical signal that reaches the interface will be reflected. In the preferred embodiment in which the arrangement is an add/drop switch, the reflection by the first trenches is from an input port to a drop port, while the reflection at a second trench is from an add port to an output port.

In one embodiment, the number (M) of input ports is equal to the number of output ports and is twice the number (M/2) of add ports and twice the number of drop ports. Each drop path then intersects M first trenches, and each add path intersects M second trenches. However, other embodiments are contemplated.

An advantage of the invention is that by providing different sets of trenches having mirror-image reflection characteristics on a single substrate, the switching arrangement enables a flexible selection of signal manipulations. In the add/drop switch embodiment, "add" signals can be switched to any one of the available output ports without rearrangement of any existing connections. Moreover, any input signal can be switched to any one of the available drop ports without rearrangement of existing connections. Another advantage of the preferred embodiment is that all of the paths from the input ports to the associated output ports are identical with respect to path length and the number of trenches that must be traversed. As a result, all of the input signals that propagate from the input ports to the output ports experience a uniform insertion loss.

DETAILED DESCRIPTION

Figure 3:
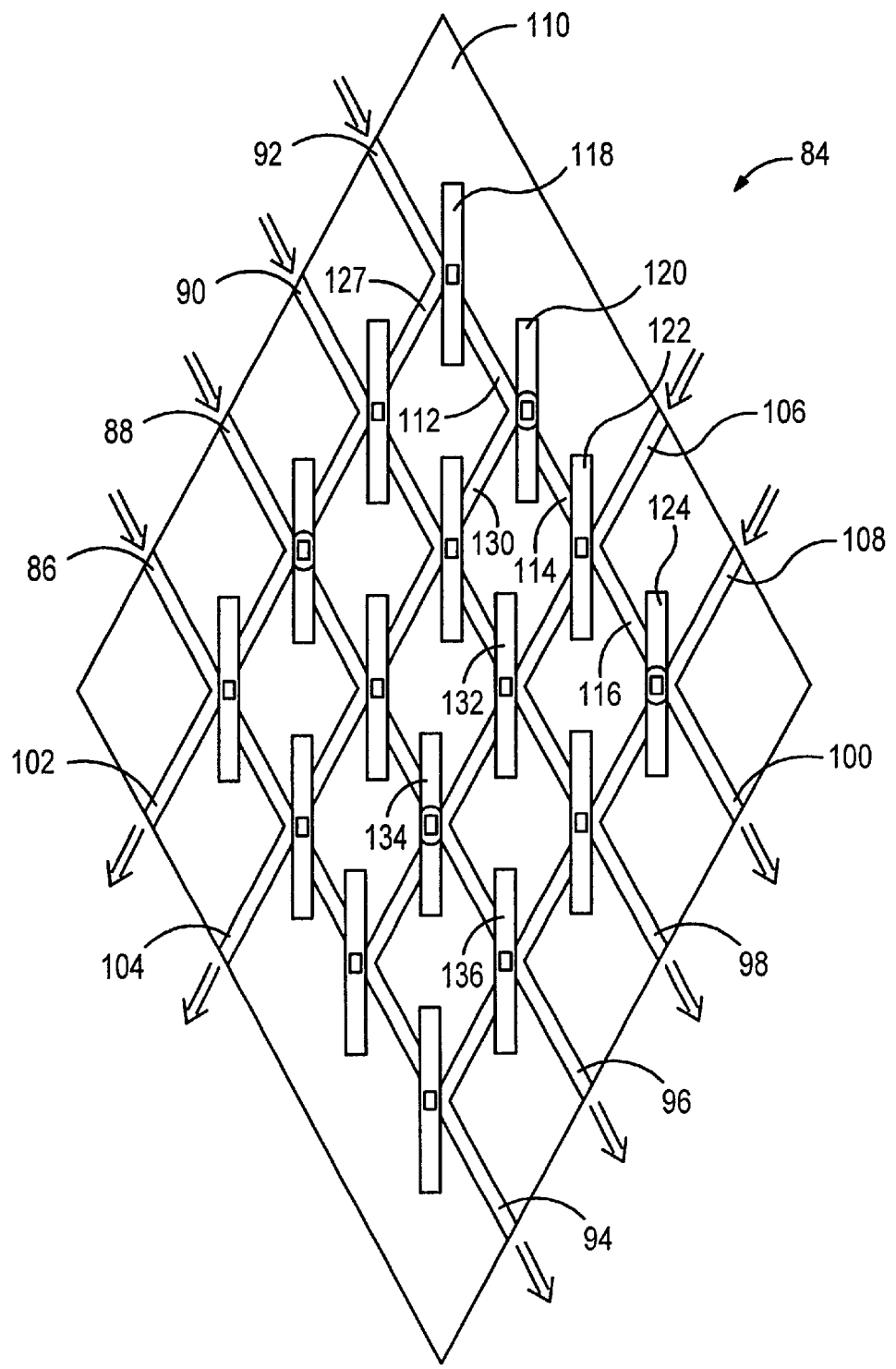
FIG. 3 is a top view of a 4×4 matrix of switching units of FIG. 1, with one set of trenches being offset in a direction opposite to the offset of a second set of trenches.

With reference to FIG. 3, a matrix 84 of optical switching units employs a number of switching cells for selectively coupling input ports 86, 88, 90 and 92 to output ports 94, 96, 98 and 100 or to either one of two drop ports 102 and 104.

Moreover, either one of two add ports 106 and 108 can be optically coupled to any one of the four output ports. Optionally, additional columns and rows of switching units may be formed on the substrate 110 and may be connected by waveguides in order to accommodate additional ports.

Figure 1:
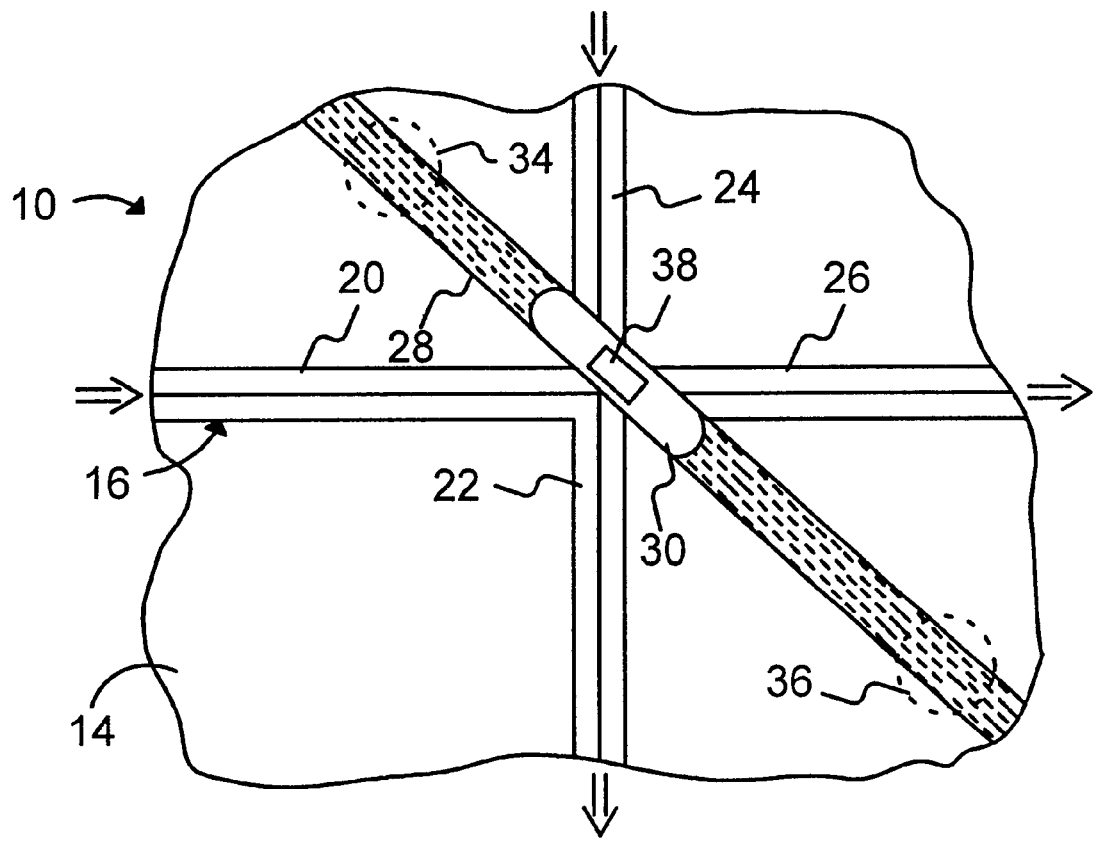
FIG. 1 is a top view of an optical switching unit that utilizes total internal reflection in accordance with the prior art and with the present invention.

While the matrix 84 will be described as having "ports" that can be optically connected by selectively coupling "waveguides" or "intermediate waveguides," it will be readily recognized by persons skilled in the art that the various ports, waveguides and intermediate waveguides are typically waveguide segments that are formed of a patterned core material and cladding layers, as previously described with reference to FIG. 1. The waveguide segments that extend to the edge of the substrate 110 for coupling to optical fibers are identified as "ports" for the purpose of more clearly distinguishing these waveguide segments from interior waveguide segments. Moreover, while not shown in FIG. 3, heaters are often formed on a heater substrate that is bonded to the waveguide substrate 110. Control circuitry for operating the heaters is typically integrated onto the heater substrate.

There are three "waveguides" that connect each input "port" 86–92 to its aligned output "port" 94–100. For example, the input port 92 is connected to the output port 100 by three intermediate waveguides 112, 114 and 116. The waveguides form a first optical path across the substrate 110. There are four parallel first optical paths in the embodiment of FIG. 3.

In addition to the four parallel first optical paths, there are two add paths and two drop paths. The add paths extend from the two add ports 106 and 108 and intersect each of the four first optical paths at trenches. In like manner, the drop paths extend through intersections with the four first optical paths to the drop ports 102 and 104.

Figure 4:
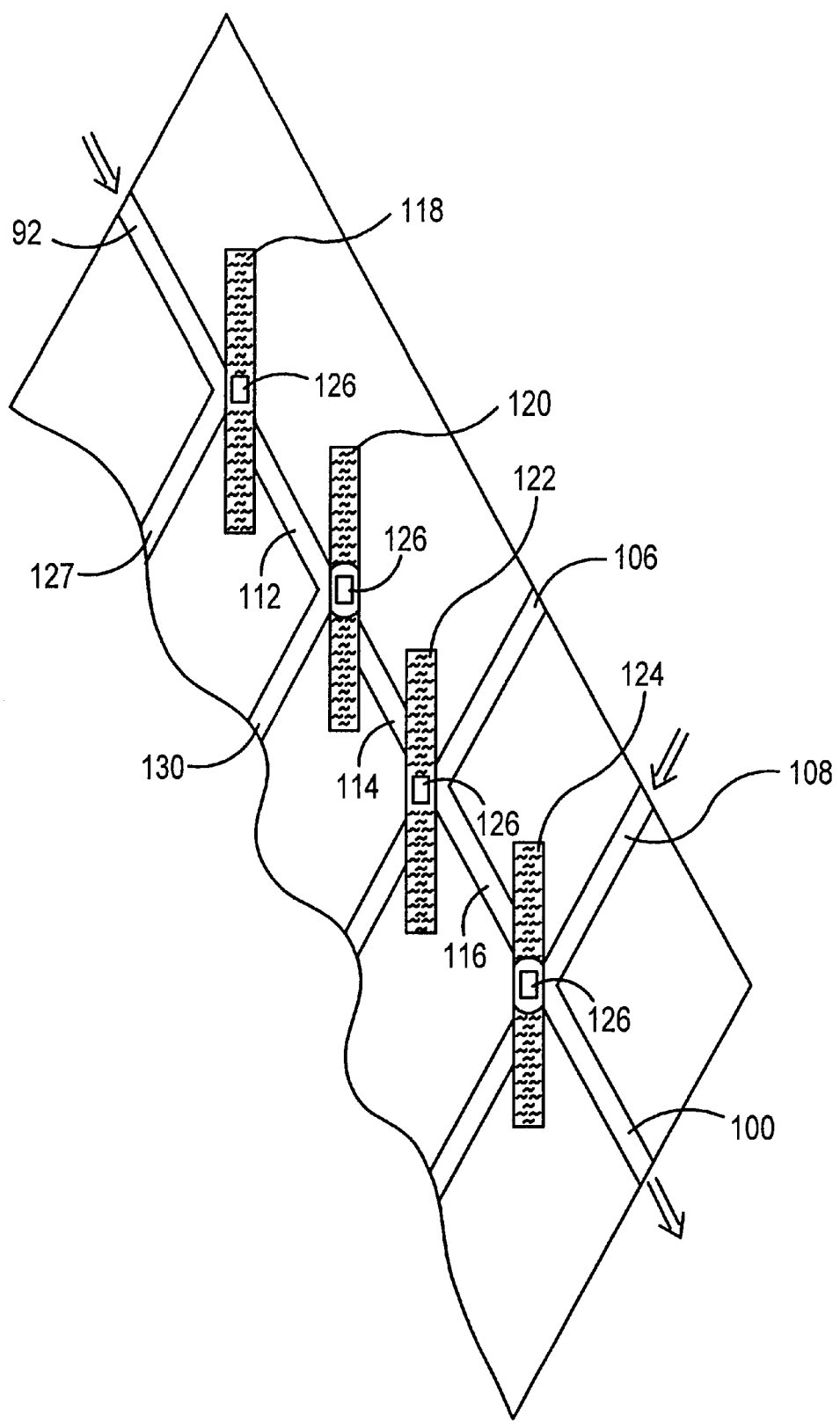
FIG. 4 is a top view of four of the switching units of FIG. 3.

A slightly enlarged drawing of the first optical path from the input port 92 to the output port 100 is shown in FIG. 4. The intermediate waveguides 112, 114 and 116 and the two ports 92 and 100 are shown as being collinear, since this is the preferred embodiment. However, in an alternative embodiment, there may be an advantage to offsetting each waveguide relative to the preceding waveguide. The offset would be designed to compensate for the lack of a precise match in the refractive indices of the waveguide material and the fluid within the trenches 118, 120, 122 and 124. When the fluid is aligned with the crosspoint of waveguides, an optical signal will propagate through the trench, but some refraction will occur. The degree of offset between adjacent waveguides is selected on the basis of the amount of refraction that occurs as a result of the mismatch in refractive indices. The same offset may be applied to the add paths and the drop paths.

Each input port 86–92 intersects the sidewall of a trench (such as the trench 118) at an angle of incidence in the range of 45° to 60°. Still referring to FIG. 4, more importantly, a waveguide 127 that also intersects the trench 118 is at an angle greater than 90° and less than 150° relative to the input port 92. A more preferred range is 96° to 135°.

Figure 2:
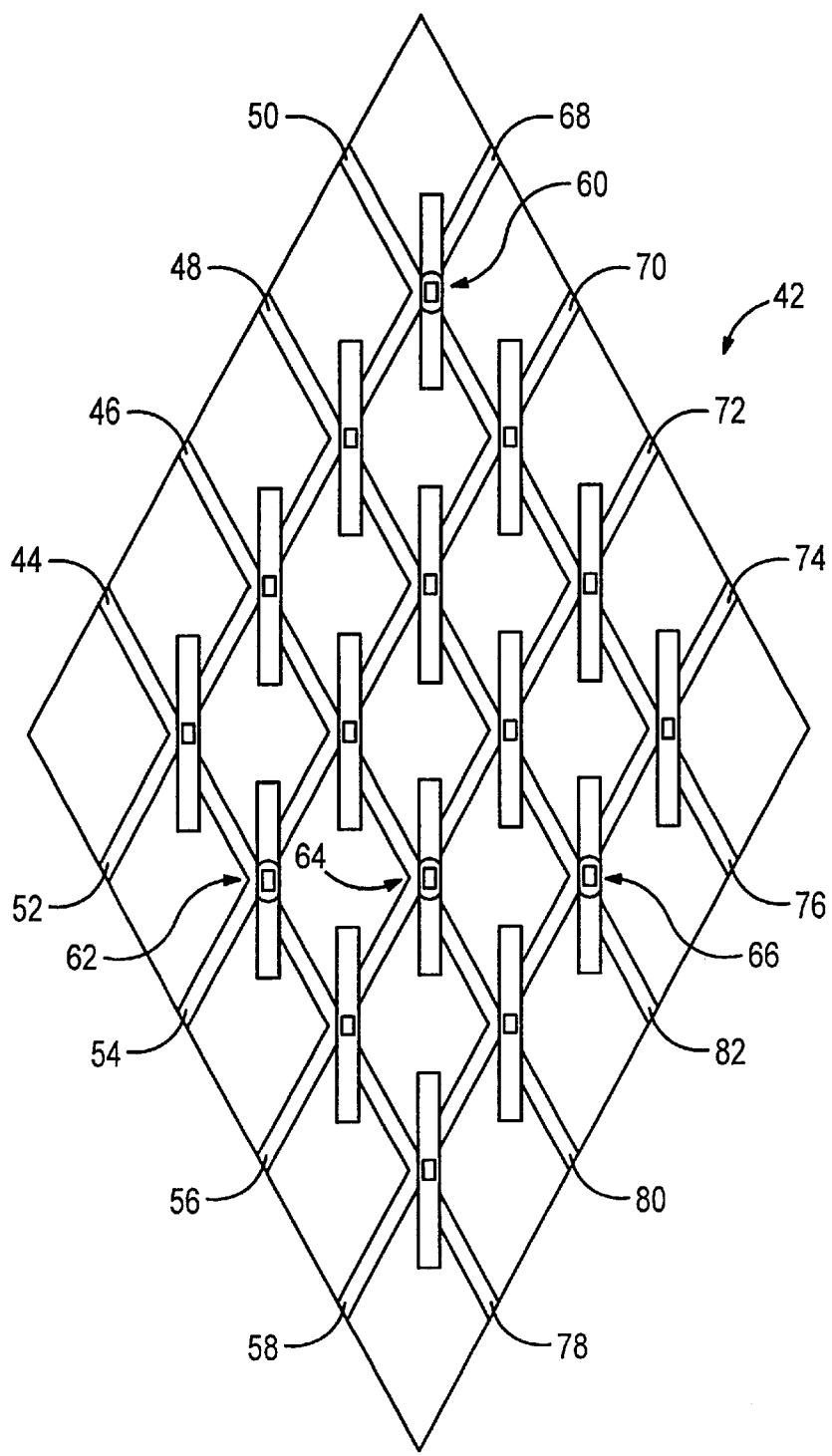
FIG. 2 is a 4×4 matrix of switching units of FIG. 1 to allow optical coupling between any one of the four input ports and any one of the four output ports in accordance with the prior art.

Each of the trenches 118–124 includes a bubble control system. As explained above with reference to FIGS. 1 and 2, heaters may be selectively activated to temporarily form a bubble within the trench. In FIG. 4, the heaters 126 are deactivated in trenches 118 and 122, so that there are no bubbles. As a result, the switching units that include the trenches 118 and 122 are in transmissive states. On the other hand, the crosspoint heaters 126 are activated within trenches 120 and 124. The activation of the crosspoint heaters toggles the switching units associated with these trenches into the reflective state. In the switch states shown in FIG. 4, an optical signal that is introduced at the input port 92 will propagate through the trench 118, but will be reflected at the sidewall of the trench 120. The reflection at the sidewall of the trench 120 redirects the optical signal to the drop path that includes waveguide 130, as seen in FIGS. 3 and 4.

An "add" signal that is introduced at the add port 108 will be reflected at the sidewall of the trench 124 and will enter the output port to be channeled to an output optical fiber, not shown. An "add" signal introduced at the add port 106 will propagate through the trench 122. Referring now to FIG. 3, the signal will continue to propagate through a trench 132, but will be reflected by a bubble within the trench 134. Following reflection, the add signal will propagate through a trench 136 and will enter the output port 96 for release via an output optical fiber, not shown.

While not shown in FIGS. 3 and 4, fluid fill-holes are usually connected to the trenches and to a liquid reservoir, allowing liquid to be replenished, as needed. Many alternative liquids may be used, with each liquid having associated advantages and disadvantages.

The geometry that allows any one of the four input ports 86–92 to be connected to either of the two drop ports 102 and 104 and that allows either one of the two add ports 106 and 108 to be optically coupled to any one of the output ports 94–100 is the relationship of the offset of trenches along the add paths relative to the offset of the trenches along the drop paths. As best seen in FIG. 4, the left sidewalls (as viewed in the orientation of FIG. 4) of trenches 118 and 120 intersect the crosspoints of the waveguides that are incident with these trenches. On the other hand, the right sidewalls of the trenches 122 and 124 are along planes which intersect the associated waveguide crosspoints. Stated differently, the trenches 118 and 120 are offset to one side of the waveguide crosspoints, while trenches 122 and 124 are offset to the opposite side of the associated crosspoints. As will be understood by persons skilled in the art, while the invention will be described as having the sidewalls intersect the crosspoints, there may be some spacing between the crosspoints and the sidewalls without rendering the switching unit inoperable for its intended purpose.

The trenches 122 and 124 are members of a set of trenches which will be referred to as "second trenches." The second trenches redirect optical signals so as to enter the first optical paths that extend to the output ports 94–100. The trenches 118 and 120 are members of a set of trenches which will be referred to as "first trenches." Each first trench is positioned relative to a crosspoint to divert light from a first optical path. Thus, a second trench that is in a reflective state, such as the trench 124, will have reflective characteristics that are the mirror image of first trenches that are in the reflective state, such as trench 120. An optical signal that is reflected at the second trench approaches the trench downwardly and to the left (as viewed in the orientation of FIG. 4) and is reflected downwardly and to the right. In contrast, an optical signal that is reflected at the first trench 120 approaches the trench downwardly and to the right and is reflected downwardly and to the left.

As can be seen in FIG. 3, each of the optical switching units along the add paths from the add ports 106 and 108 includes a second trench, i.e., a trench that is offset to the side of the waveguide crosspoint to divert light from the add path to one of the paths to an output port 94–100. On the other hand, each switching unit along one of the drop paths to a drop port 102 and 104 includes a first trench, i.e., a trench which diverts light from an input port 86–92 to one of the drop ports 102 and 104. It is this geometry that enables any one of the input ports to be optically coupled to either one of the drop ports and enables either one of the add ports 106 and 108 to be optically coupled to any one of the output ports 94–100. Optionally, more add ports and more drop ports may be utilized. Preferably, the number (M) of input ports is equal to the number of output ports and is twice the number of add ports and twice the number of drop ports. However, other configurations may be utilized.

While the invention has been described and illustrated as being used in an add/drop switching application, the mirror-image switching units on a single substrate may be used in other applications in which increased flexibility of signal manipulation is desired. However, the add/drop switching application is the preferred embodiment.

What is claimed is:

1. An optical add/drop switch comprising:
   a plurality of input ports for receiving optical signals;
   a plurality of output ports operatively associated with said input ports by first optical paths from said input ports to corresponding output ports;
   a plurality of add ports selectively coupled to said first optical paths;
   a plurality of drop ports selectively coupled to said first optical paths; and
   a matrix of optical switching units positioned along said first optical paths from said input ports to said corresponding output ports, each of said switching units being responsive to manipulation of index-matching fluid to switch said each switching unit between a reflective state and a transmissive state, said optical switching units being arranged and oriented within said matrix and relative to said first optical paths such that by selective manipulation of said fluid within said switching units any one of said add ports is optically coupled to any one of said output ports and any one of said input ports is optically coupled to any one of said drop ports.

2. The optical switch of claim 1 wherein each said first optical path between corresponding input and output ports is formed by a plurality of generally aligned optical waveguides, such that said corresponding input and output ports are generally aligned, said first optical paths being substantially parallel to each other.

3. The optical switch of claim 2 wherein said drop ports are selectively coupled to said first optical paths by second optical paths and wherein said add ports are selectively coupled to said first optical paths by third optical paths that are substantially parallel to said second optical paths, said second and third optical paths intersecting said first optical paths at crosspoints, said optical switching units being located at said crosspoints.

4. The optical switch of claim 3 wherein each said optical switching unit that is located at a crosspoint of a particular first optical path with a particular second optical path is oriented to transfer an optical signal from said particular first optical path to said particular second optical path when said optical switching unit is in said reflective state, thereby propagating said optical signal from one of said input ports to one of said drop ports.

5. The optical switch of claim 4 wherein each optical switching unit that is located at a crosspoint of a specific third optical path with a specific first optical path is oriented to transfer an optical signal from said specific third optical path to said specific first optical paths when said optical switching unit is in said reflective state, thereby propagating said optical signal from one of said add ports to one of said output ports.

6. The optical switch of claim 5 wherein said optical switching units include first switching units with trenches at first sides of said first crosspoints and include second switching units having trenches at second sides of said second crosspoints, said second sides being opposite to said first sides.

7. The optical switch of claim 6 wherein said trenches have parallel lengthwise axes.

8. The optical switch of claim 2 wherein said index-matching fluid has a refractive index that is sufficiently close to a refractive index of said optical waveguides to enable propagation of optical signals through said fluid when said fluid is between a pair of generally aligned optical waveguides.

9. The optical switch of claim 1 wherein there are M input ports and M output ports and wherein there are M/2 add ports and M/2 drop ports.

10. An optical switch comprising:
    a plurality of generally parallel first optical paths, each first optical path including aligned waveguides that are spaced apart by trenches, each first optical path having an input port at one end and an output port at an opposite end;
    a plurality of signal drop paths that intersect each of said first optical paths at first trenches, each signal drop path having a drop port at a first side of said plurality of first optical paths;
    a plurality of signal add paths that intersect each of said first optical paths at second trenches, each signal add path having an add port at a second side of said plurality of first optical paths opposite to said first side;
    fluid within said trenches, said fluid having a refractive index that enables propagation of optical signals through said trenches and along said first optical paths when said fluid is aligned with said first optical paths; and
    means for manipulating said fluid within said trenches to selectively switch said trenches between transmissive states and reflective states, depending upon a presence or an absence of said fluid in alignment with said first optical paths;
    wherein said first trenches are offset from crosspoints of said first optical paths with said signal drop paths and wherein said offset is in a direction opposite to a direction of an offset of said second trenches relative to crosspoints of said first optical paths with said signal add paths.

11. The optical switch of claim 10 wherein said first and second trenches have first walls on a side adjacent to said drop ports and have second walls on a side adjacent to said add ports, said first walls of said first trenches generally intersecting said crosspoints of said first optical paths with said signal drop paths, said second walls of said second trenches generally intersecting said crosspoints of said first optical paths with said signal add paths.

12. The optical switch of claim 10 wherein said first and second trenches are aligned in a common direction.

13. The optical switch of claim 10 wherein said signal drop paths are formed by first parallel waveguides and wherein said signal add paths are formed by second parallel waveguides.

14. The optical switch of claim 10 wherein said first trenches are located such that any one of said drop ports can be optically coupled to any one of said input ports, said second trenches being located such that any one of said add ports can be optically coupled to any one of said output ports.

15. An optical switching arrangement for manipulating optical signals among waveguides on a substrate comprising:

a plurality of parallel first optical paths having input ports at each first end and output ports at each second end, each first optical path being formed by a plurality of spaced apart first waveguides;

a plurality of parallel second optical paths that intersect said first optical paths at crosspoints, said second optical path having drop ports at second ends of a signal-dropping set and add ports at first ends of a signal-adding set, each second optical path being formed by a plurality of spaced apart second waveguides;

fluid-containing trenches having sidewalls that intersect said crosspoints, with selected first trenches having an offset in an opposite direction from an offset of second trenches, said offsets being relative to said crosspoints such that sidewalls that intersect said crosspoints by said first trenches are on opposite trench sides for sidewalls that intersect said crosspoints by said second trenches; and means for manipulating fluid within said trenches, said fluid enabling propagation of optical signals through said trenches when said fluid resides at said crosspoints, said fluid being selectively manipulated to enable any of said add ports to be in optical communication with any of said output ports and any of said input ports to be in optical communication with any of said drop ports.

16. The switching arrangement of claim 15 wherein said sidewall of each said first trench is located relative to an intersected said crosspoint to reflect optical signals from one of said first waveguides to one of said second waveguides when said first trench has an absence of said fluid at said intersected crosspoint.

17. The switching arrangement of claim 16 wherein said sidewall of each said second trench is located relative to an intersected said crosspoint to reflect optical signals from one of said second waveguides to one of said first waveguides when said second trench has an absence of said fluid at said crosspoint intersected by said second trench.

18. The switching arrangement of claim 15 wherein said fluid has a refractive index selected to substantially match a refractive index of said first and second waveguides.

* * * * *